United States Patent [19]
Burkhard et al.

[11] Patent Number: 5,408,970
[45] Date of Patent: Apr. 25, 1995

[54] ELECTRONICALLY CONTROLLED CONTINUOUS FLOW FUEL SYSTEM

[75] Inventors: James F. Burkhard, Spencerport; Kenneth J. Dauer, Avon; William H. Pettit, Rochester, all of N.Y.

[73] Assignee: General Motors Corporation, Detroit, Mich.

[21] Appl. No.: 236,980

[22] Filed: May 2, 1994

[51] Int. Cl.⁶ ............................................. F02M 37/00
[52] U.S. Cl. .................................... 123/447; 123/467; 431/30; 431/121
[58] Field of Search .................. 123/447, 467; 431/30, 431/121

[56] References Cited

U.S. PATENT DOCUMENTS 3,777,726 12/1973 Knapp et al. ........................ 123/447
4,280,464 7/1981 Kanai et al. ........................ 123/447
4,676,214 6/1987 Kato et al. ........................ 123/447

Primary Examiner—Carroll B. Dority
Attorney, Agent, or Firm—Karl F. Barr, Jr.

[57] ABSTRACT

An electronically controlled fuel system for use with a continuous, non-cyclical process has a fuel manifold to which pressurized fuel from a source is supplied and through which the fuel is metered, to an end use combustor, by a periodically energizable pulse-width modulated, solenoid actuated valve. The pulsed fuel output of the valve is exposed to an accumulator which operates on the output to reduce the amplitude of the pulsations effectively integrating them out of the fuel flow, resulting in a substantially continuous supply of fuel. A purge system may be integrated into the fuel manifold and has a second solenoid actuated valve member which is operable, upon fuel system shut-down, to direct pressurized air through the fuel system to remove excess fuel.

3 Claims, 4 Drawing Sheets

ELECTRONICALLY CONTROLLED CONTINUOUS FLOW FUEL SYSTEM

TECHNICAL FIELD

This invention relates to fuel systems for end-use devices requiring continuous flow and, in particular, to an electronically controlled, continuous flow fuel system having an electromagnetic fuel injector for metering fuel.

BACKGROUND

Continuous cycle processes such as those employed in automotive burner applications, gas turbines, Stirling engines and steam engines typically require that fuel be supplied in precise quantities at a continuous rate of delivery. Conventional electromagnetic solenoid actuated valves are used to supply fuel to cyclic processes such as Otto and Diesel engines in which an electrical supply current is pulse-width modulated to vary the open time of the valve to correspond with engine timing, performance demands, and other understood principles. By varying the open time of an essentially fixed orifice, the flow rate over time can be precisely controlled. With this means of fuel delivery, however, the output from the valve is pulsed at the same frequency at which the valve is operated. These pulsations are undesirable for use in continuous processes as they may affect overall efficiency, increase emissions, increase audible noise generated during operation and impact robustness of the end use device.

SUMMARY OF THE INVENTION

The present invention is directed to an electronically controlled fuel system for use with a continuous, non-cyclical process such a an automotive burner system. The subject fuel system utilizes an electromagnetic solenoid actuated valve, such as a fuel injector, which is pulse-width modulated through a controller to discharge a desired, metered quantity of fuel to the end-use combustor. The metered and pulsed output of the injector is subjected to a reduction in amplitude or severity of the pulses through the addition of an accumulator which is disposed between the outlet of the fuel injector and the inlet of the combustor. The accumulator operates, upon introduction of a fuel pulse, to fill with a portion of the fuel from the metered pulse of fuel while directing the remainder of the metered pulse of fuel to the combustor. Following the termination of the pulse, and prior to the introduction of a subsequent fuel pulse, the fuel within the accumulator is discharged, to the end use combustor and, as a result, the amplitude of the fuel pulses are minimized and a substantially continuous fuel supply is provided.

The present invention advantageously provides a substantially continuous flow of fuel to a continuous cycle process thereby improving efficiency, emissions, robustness and noise characteristics over a system supplying a pulsed supply of fuel while taking advantage of the precise fuel metering characteristics of the electromagnetic fuel injector and the ease of control for such a device using pulse-width modulated, electronic control.

Other objects, features, and advantages of the invention will become apparent by reference to the following description and to the drawings.

DESCRIPTION OF THE PREFERRED EMBODIMENTS

Figure 1:
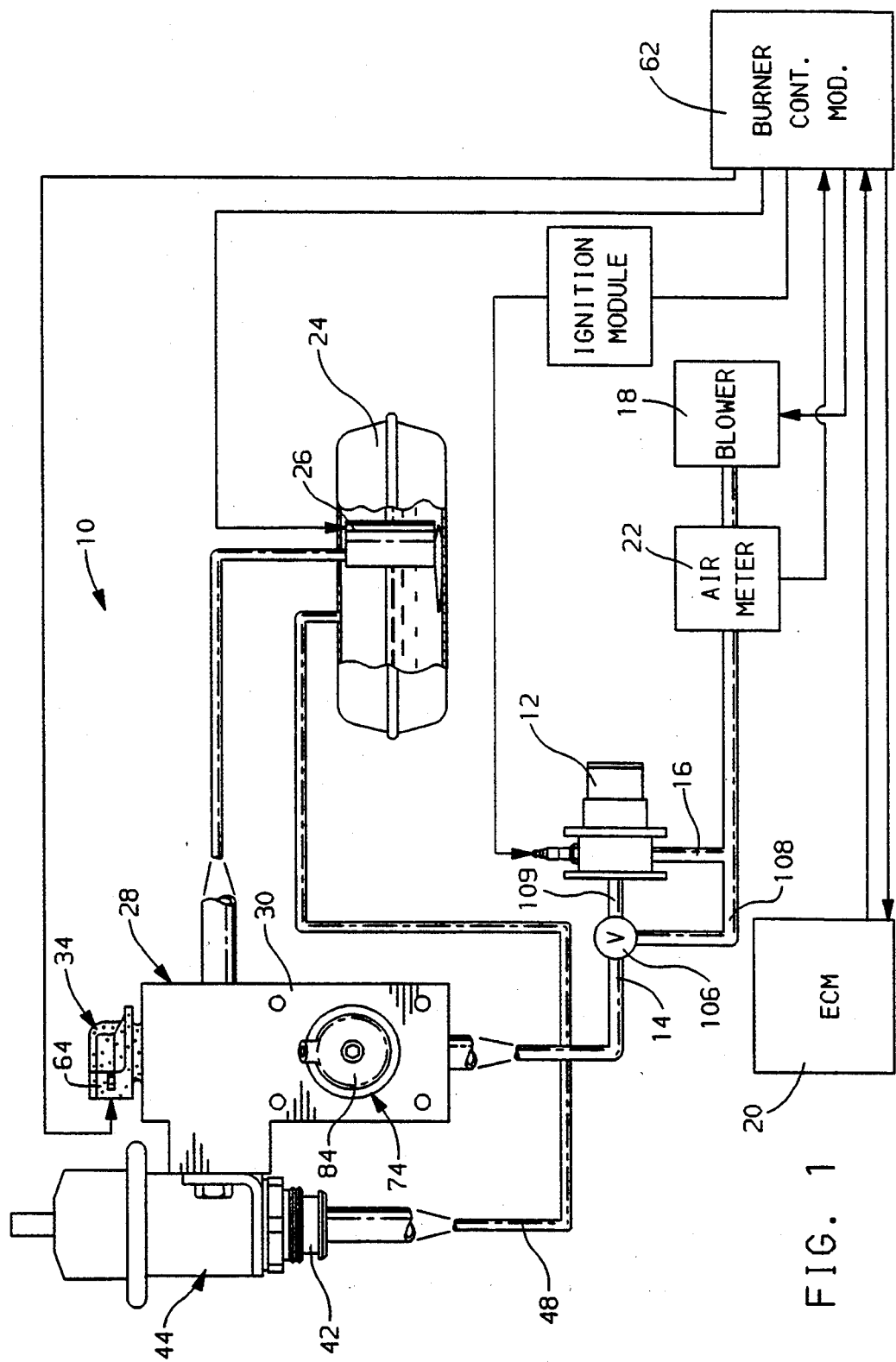
FIG. 1 is a schematic diagram of a fuel system embodying features of the present invention.

In FIG. 1 there is illustrated a system layout for an automotive burner. Such a burner may have application in the preheating of engine coolant, exhaust treatment devices, or may be used to regenerate particulate traps used to filter the exhaust gas of certain internal combustion engines. Such a system has numerous potential configurations and components with only one such contemplated system shown for illustrative purposes. The burner system, referred to generally as 10, includes a burner or combustor 12 to which the combustion components of fuel and air are supplied via conduits 14 and 16, respectively. A pressurized source for combustion air may be blower 18 which receives a control signal from Burner Control Module (BCM) 62 based on vehicle and system inputs including flow information from air meter 22. A source of fuel such as fuel tank 24 is drawn on by fuel pump 26 to supply pressurized fuel for the combustor 12. In an automotive application, the fuel pump 26 will supply pressurized fuel not only for the combustor 12, which may operate on an intermittent basis, but also for the vehicle prime mover such as a diesel or gasoline internal combustion engine. As such, the fuel pump can not be relied on to precisely control the fuel quantity, pressure and delivery of fuel to the combustor 12.

Figure 2:
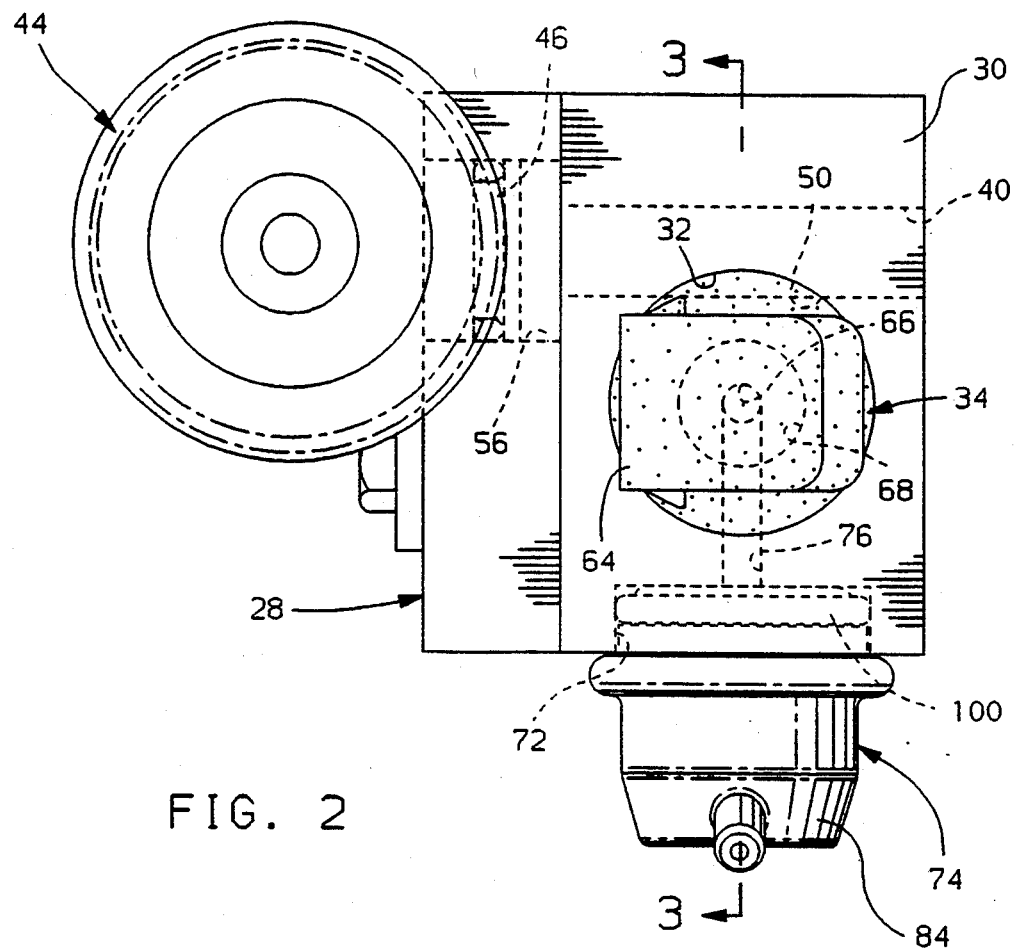
FIG. 2 is a plan view of the fuel manifold assembly of the present invention.
Figure 3:
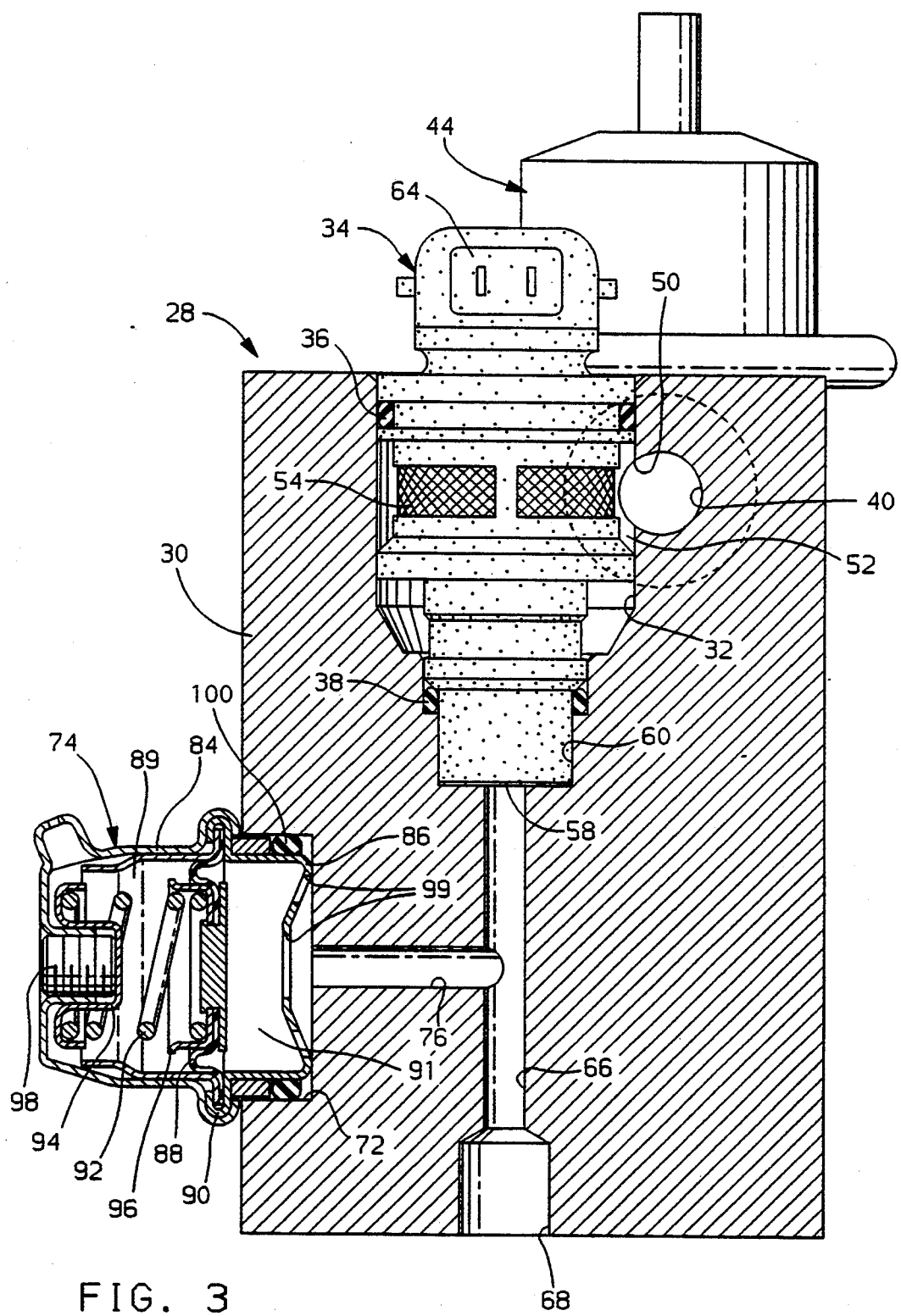
FIG. 3 is a sectional view of the fuel manifold assembly of FIG. 2, taken along line 3—3.

A fuel manifold assembly 28, shown in FIGS. 1, 2 and 3 provides the necessary conditioning and metering of the fuel supply from pump 26, required for optimum operation of the combustor 12, or other end use device. The fuel manifold comprises a block 30 constructed of material which has the appropriate durability for such a fuel environment. The block 30 has a first, cylindrical, stepped diameter bore 32 which is adapted to receive a periodically energizable, electromagnetic solenoid actuated metering valve such as fuel injector 34. Resilient sealing members 36 and 38 are disposed between the injector 34 and the wall of the bore 32 to prevent migration of fuel out of the injector or from the inlet region of the injector to the outlet region, respectively. The injector may be retained within the manifold block 30 by any of a number of known methods.

A fuel supply passage 40 transits the manifold block 30. The passage has a first outlet 56 which is configured to receive the inlet 46 of a fuel pressure regulator 44 mounted to an outer portion of the block 30. The pressure regulator has an outlet 42 which communicates with fuel return conduit 48, for return of excess fuel to fuel source 24. The pressure regulator 44 operates in a well known manner to maintain fuel, within fuel supply passage 40 of block 30, at a regulated pressure. Fuel supply passage 40 has a second outlet 50 at the intersection of the passage 40 and the annular fuel inlet region 52 of the cylindrical injector bore 32. Fuel entering through second outlet 50 circulates within the annular region 52 and enters injector 34 through inlet openings 54. Excess fuel exits fuel manifold block 30 through first outlet 56 where it is discharged to conduit 48 for return to the fuel tank 24. In addition to inlet openings 54, the injector 34 has an outlet 58 for discharging fuel which is metered therethrough. The outlet resides in the outlet region 60 of the bore 32 which is isolated from the inlet region 52 by resilient sealing member 38. During system operation, the ECM 20 supplies an enabling signal to the burner control module 62 which, in turn, transmits a pulse-width modulated signal to the fuel injector 34 via terminal 64, thereby actuating the injector for delivery of a desired fuel flow rate determined by the percent (%) on, or open time of the solenoid actuated valve.

A second fuel passage 66 in manifold block 30 communicates with the outlet 58 of fuel injector 34. The second fuel passage 66 receives the pulsed, metered fuel from the injector outlet 58 and conducts the fuel to manifold outlet 68. The outlet 68 in manifold 30 receives one end of fuel conduit 14, while the other end of the conduit delivers fuel to the combustor 12.

Fluid discharged from injector 34 is pulsed at the same frequency at which the valve is actuated, resulting in a pulsating fuel supply which is undesirable for continuous cycle processes such as burner 12. Fuel manifold block 30 includes a second, cylindrical bore 72 which is adapted to receive an accumulator 74. The bore 72 communicates with second fuel passage 66 through branch passage 76 allowing the accumulator to operate on the metered, pulsed fuel supply departing the outlet 58 of the fuel injector 34. The accumulator has a modular, or cartridge design intended to simplify assembly and servicing of the fuel system. The accumulator 74 includes a two piece housing having members 84,86, respectively. A diaphragm 88 extends across the interior of the housing to effectively divide the interior into two chambers 89,91. The diaphragm 88 is fixed in position at seam 90 where the housings 84,86 are crimped together. A biasing member such as spring 92 is positioned in chamber 89 of the divided housing. The spring is captured at one end by adjustable retainer 94 and at its other end by spring seat 96 which communicates with the diaphragm 88. As such, the spring 92 exerts a biasing force on diaphragm 88 which may be modified through threaded adjusting nut 98 of retainer 94. The housing member 86 is configured to be seated within cylindrical bore 72 of the manifold block 30. A resilient sealing member such as O-ring 100 establishes a leak-tight seal between the accumulator and cylinder bore 72. Chamber 91 of the divided housing is open to branch passage 76 through one or more openings 99 in the lower housing member 86. As the injector 34 meters a pulse of fuel into outlet passage 66 and branch passage 76, the flexible diaphragm 88 moves into chamber 89, defined by housing member 84, against the bias of spring member 92, effectively increasing the volume of branch passage 76 and reducing the effective output of the injector 34. Upon termination of the fuel pulse, the expanded diaphragm 88 of the accumulator 74 contracts under the bias of spring 92, thereby continuing the discharge of fuel from the manifold 34. In such manner, the amplitude of each pulse of fuel is reduced such that the pulsations are integrated out of the metered fuel to provide a substantially continuous flow of fuel to the burner 12. The effective damping of the fuel pulses by accumulator 74 may be adjusted by rotation of the adjustment nut 98 to increase or decrease the spring bias exerted on the diaphragm 88. The use of spring member 92 to exert an opposing force on the diaphragm 88 provides exceptional tolerance to varying ambient conditions and fuels as the spring force, once set, remains a constant.

Figure 4:
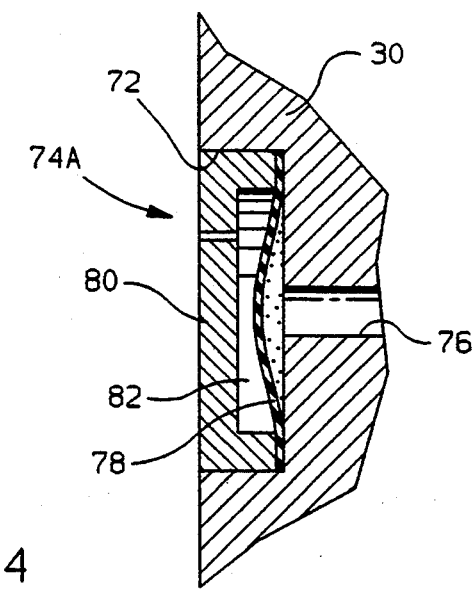
FIG. 4 is a partial, sectional view of one embodiment of an accumulator, of the present invention.

Accumulator 74 may comprise any of a number of configurations. A second embodiment of the accumulator, referenced by numeral 74A, for use with the present invention is shown in FIG. 4. In this embodiment, the accumulator 74A has an elastomeric diaphragm 78 disposed in the bore 72 such that it covers one end of branch passage 76 to prevent fuel leakage from the manifold block 30. The diaphragm 78 is held in its position over the branch passage outlet by a cover 80 which defines an open space 82 above a portion of the diaphragm. As the injector 34 meters a pulse of fuel into outlet passage 66 and branch passage 76, the flexible diaphragm 78 flexes outwardly, into the open space 82 within cover 80, effectively increasing the volume of branch passage 76 and reducing the effective output of the injector 34. Consequently, upon termination of the fuel pulse, the expanded diaphragm 78 of the accumulator 74A contracts, forcing fuel through conduit 76 and passage 66, thereby continuing the discharge of fuel from the manifold 30. In such manner, the amplitude of each pulse of fuel is reduced such that the pulsations are integrated out of the metered fuel to provide a substantially continuous flow of fuel to the burner 12.

Durability of the combustor nozzle may dictate that a means of purging the nozzle, usually with air, be employed in the fuel system to eliminate fuel coking and varnishing from occurring during high temperature excursions after system shut down. Purging can either pull residual fuel back from the combustor 12 or blow it through the combustor. In either case, it is desirable to minimize the volume of fuel between the metering device and the combustor so as to lessen the impact on burner emissions and reduce the time for system fill and, therefore, system ignition. The system illustrated in FIG. 1 uses a separate air purge valve 106 closely adjacent to the end use combustor 12. Upon termination of burner operation, the purge valve 106, which may be a solenoid operated three-way valve, is actuated to block the fuel line 14 from the fuel manifold 28 to the combustor 12. Simultaneously, pressurized air from blower 18 is allowed to pass through branch 108 of conduit 16 through the valve 106 and to the combustor 12 to thereby remove any excess fuel from the short fuel line segment 109 between the valve 106 and the burner 12. The use of a separate purge valve 106 as shown in FIG. 1 allows the purge valve to be advantageously positioned with respect to the combustor, however, a separate valve assembly is required.

Figure 5:
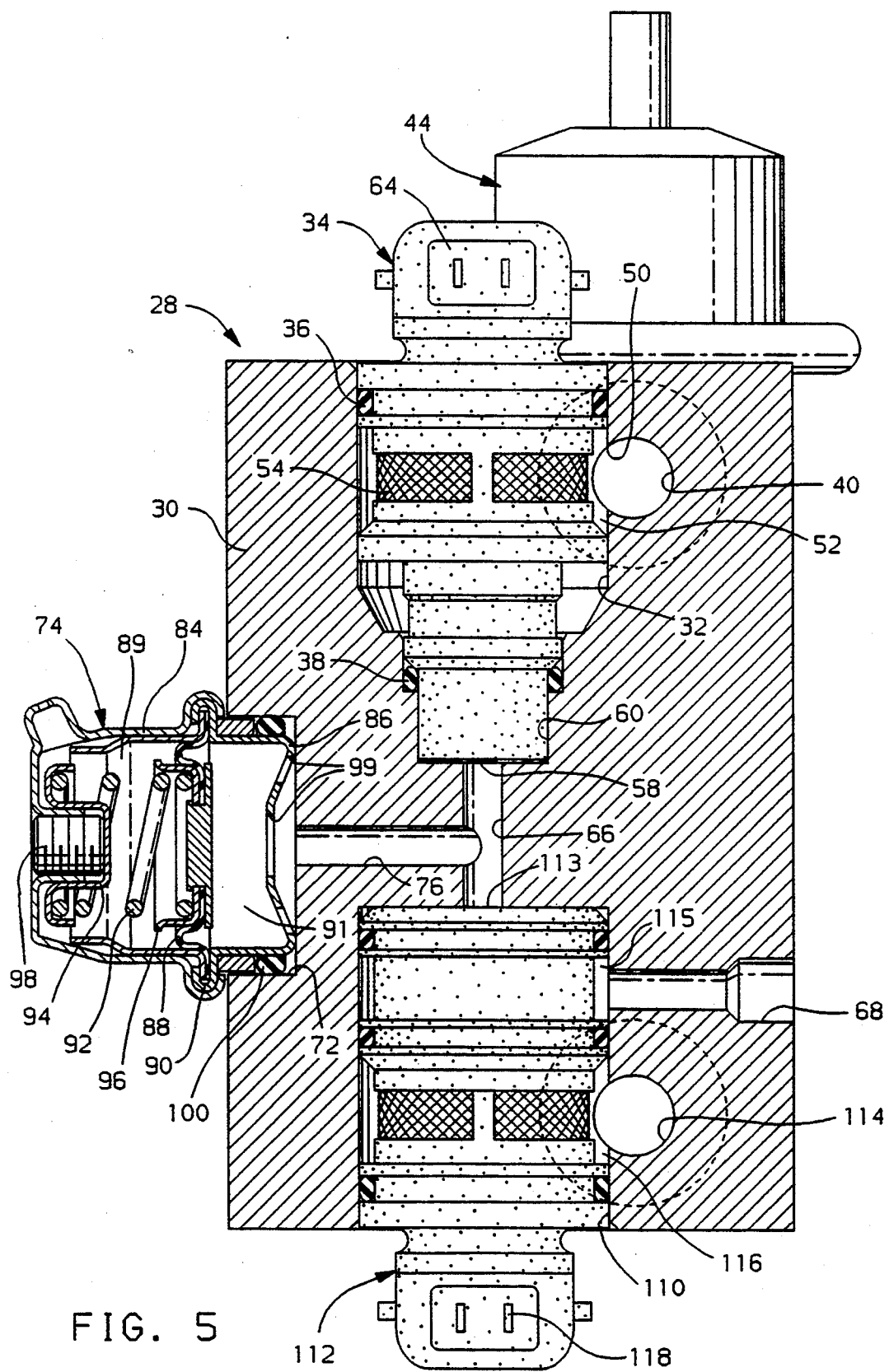
FIG. 5 is a sectional view of a second embodiment of the fuel manifold assembly of the present invention.

An alternative fuel system is that shown in FIG. 5, in which features described above and in FIGS. 1–4 have like numerals. In the alternative design disclosed, manifold block 30 of fuel manifold assembly 28 includes a third cylindrical, stepped bore 110 which is configured to receive a purge valve assembly 112. Any one of several types of purge valves may be used to achieve the stated purpose such as the electromagnetic solenoid actuated three position valve 112 illustrated. The bore 110 operates as a terminus for second fuel passage 66 and metered fuel injected into passage 66 by fuel injector 34 enters bore 110 and valve inlet 113.

During operation of burner/combustor 12, fuel entering valve inlet 113 is allowed to pass, unimpeded, through purge valve 112 to outlet region 115 where the fuel exits manifold block 30 through outlet 68. An air inlet passage 114 supplies pressurized air to the inlet region 116 of the purge valve 112 which, upon receipt of an enabling electrical signal from controller 62, via electrical terminal 118, blocks the passage of fuel from conduit 66 to outlet 68 and meters purge air through the valve 112 to manifold outlet passage 68 where the pressurized air forces fuel within the manifold block 30 and associated fuel line 109, between the block 30 and the combustor 12, to be cleared of excess fuel.

The fuel system disclosed provides the simplicity and controllability of a solenoid valve based fuel system for application to a continuous cycle process end-use device. A fuel distribution manifold incorporates an elastomeric pulse accumulator which integrates or averages out the on and off pulses supplied by the metering injector into one substantially continuous flow suitable for use in noncyclical devices. In applications which require intermittent operation of the combustor, a purge system for the disclosed fuel supply system is also provided. The purge system empties the fuel system of residual fuel following combustor shut-down to prevent choking of fuel and the associated durability concerns inherent with such action.

The foregoing description of the preferred embodiment of the invention as been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore the foregoing description is to be considered exemplary, rather than limiting, and the true scope of the invention is that described in the following claims.

The embodiments of the invention in which an exclusive property or privilege is claimed are defined as follows:

1. A fuel system comprising an electromagnetic solenoid actuated valve configured to receive pressurized fuel from a source and a pulse width modulated electrical signal from a controller, said signal operable to periodically energize said valve to thereby open and close said valve and permit metered pulses of fuel to exit therefrom, a fuel conduit configured to receive said metered pulses of fuel from said valve and conduct said fuel to an end use combustor, and an accumulator in communication with said fuel conduit and operable, upon receipt by said conduit of a metered fuel pulse from said valve, to fill with fuel and, upon termination of said therein, thereby reducing the amplitude of said pulse of fuel, wherein fuel supplied to an end use combustor from said system is substantially continuous.

2. A fuel system for supplying a precisely metered, substantially continuous flow of fuel to an end use combustor comprising, a periodically energizable electromagnetic solenoid actuated metering valve having an inlet configured to receive pressurized fuel from a source, an outlet for discharging fuel, metered through said valve, and means for receiving a periodic electrical signal operable to open and close said metering valve to permit metered pulses of fuel to exit said outlet, said fuel system further comprising a fuel conduit extending between said metering valve outlet and said end use combustor, said conduit including an accumulator operable, upon receipt by said conduit of a metered pulse of fuel from said valve, to fill with a portion of said fuel from said metered pulse and, upon termination of said metered pulse of fuel, to discharge said accumulated pulse of fuel thereby reducing the amplitude of each pulse of fuel, wherein fuel supplied to said end use combustor is substantially continuous.

3. A fuel system for supplying a precisely metered, substantially continuous flow of fuel to an end use combustor comprising, a fuel manifold having a first, stepped bore adapted to receive a periodically energizable electro-magnetic solenoid actuated metering valve having an inlet configured to receive pressurized fuel, an outlet for discharging fuel metered through said valve, and means for receiving a periodic signal operable to open and close said metering valve to permit metered pulses of fuel to exit said outlet, a first fuel passage transiting said manifold, and having an inlet adapted to receive pressurized fuel from a source, a first outlet, in communication with said first stepped bore to supply fuel to said inlet of said metering valve, and a second outlet adapted to return excess fuel to said source, a second fuel passage in communication with, and adapted to receive fuel from said outlet of said metering valve and extending to a manifold outlet having means for connection with said end use combustor, and a second bore, in communication with said second fuel passage, and having fuel accumulating means disposed therein, said accumulator operable, upon receipt by said second fuel passage of a metered pulse of fuel from said valve, to fill with a portion of the fuel from said metered pulse and, upon termination of said metered pulse of fuel, to discharge said accumulated portion of fuel to said passage to thereby reduce the amplitude of each pulse of fuel, wherein fuel supplied to said manifold outlet is substantially continuous.

* * * * *